United States Patent
Wang

(10) Patent No.: US 8,011,592 B2
(45) Date of Patent: Sep. 6, 2011

(54) TEMPERATURE MANAGEMENT IN AN INTEGRATED CIRCUIT CARD WITH ELECTROPHORETIC DISPLAY

(75) Inventor: Chein-Hsun Wang, Hsin-Chu (TW)

(73) Assignee: Sipix Imaging, Inc., Milpitas, CA (US)

( * ) Notice: Subject to any disclaimer, the term of this patent is extended or adjusted under 35 U.S.C. 154(b) by 568 days.

(21) Appl. No.: 11/972,150

(22) Filed: Jan. 10, 2008

(65) Prior Publication Data
US 2008/0173719 A1    Jul. 24, 2008

Related U.S. Application Data

(60) Provisional application No. 60/885,868, filed on Jan. 19, 2007.

(51) Int. Cl.
*G09G 3/36* (2006.01)

(52) U.S. Cl. .................... 235/492; 345/101

(58) Field of Classification Search ............. 235/492; 345/101
See application file for complete search history.

(56) References Cited

U.S. PATENT DOCUMENTS

| | | | |
|---|---|---|---|
| 4,011,552 A | 3/1977 | Quirke | |
| 4,302,971 A | 12/1981 | Luk | |
| 4,972,099 A * | 11/1990 | Amano et al. | 382/313 |
| 5,272,477 A * | 12/1993 | Tashima et al. | 340/870.16 |
| 6,019,284 A | 2/2000 | Freeman et al. | |
| 6,176,197 B1 | 1/2001 | Thompson | |
| 6,454,172 B1 | 9/2002 | Maeda et al. | |
| 6,561,430 B2 | 5/2003 | Ou | |
| 6,774,883 B1 * | 8/2004 | Muhlemann | 345/101 |
| 6,902,115 B2 * | 6/2005 | Graf et al. | 235/472.01 |
| 6,930,818 B1 | 8/2005 | Liang et al. | |
| 6,932,269 B2 * | 8/2005 | Sueyoshi et al. | 235/382 |

(Continued)

FOREIGN PATENT DOCUMENTS

| | | | |
|---|---|---|---|
| JP | 03282691 A | * | 12/1991 |
| JP | 2000-336641 | | 1/2002 |
| KR | 1020090129191 A | | 12/2009 |
| WO | WO 2005/027088 A | | 5/2005 |

OTHER PUBLICATIONS

PCT invitation to pay additional fees and , where applicable, protest fee; International Application No. PCT/US2008/050882; mail date Jul. 24, 2008; 9 pages.

(Continued)

*Primary Examiner* — Thien M. Le
*Assistant Examiner* — Christle Marshall
(74) *Attorney, Agent, or Firm* — Hickman Palermo Truong & Becker LLP

(57) ABSTRACT

In an embodiment, a display module comprises a temperature sensor configured to provide temperature information; a transmission interface, coupled to an external chip of the IC card; a processing module, coupled to the temperature sensor and the transmission interface, comprising: a storage device comprising an application software program; and a processing unit, coupled to the storage device, configured to be capable of executing the application software program to access data from the external chip via the transmission interface, obtaining the temperature information from the temperature sensor, and outputting a control signal according to the temperature information and data; a display driver, coupled to the processing module, configured to be capable of receiving the control signal and generating a driving signal according to the control signal; and a display film capable of displaying images, coupled to the display driver, and configured to be capable of displaying information according to the driving signal.

26 Claims, 6 Drawing Sheets

U.S. PATENT DOCUMENTS

| | | | |
|---|---|---|---|
| 6,950,220 B2* | 9/2005 | Abramson et al. | 359/265 |
| 7,626,444 B2* | 12/2009 | Clewett et al. | 327/535 |
| 2003/0011868 A1* | 1/2003 | Zehner et al. | 359/296 |
| 2004/0112966 A1* | 6/2004 | Pangaud | 235/492 |
| 2005/0163940 A1* | 7/2005 | Liang et al. | 428/1.1 |
| 2006/0049263 A1* | 3/2006 | Ou et al. | 235/492 |
| 2006/0097059 A1 | 5/2006 | Miyazaki | |
| 2006/0209055 A1* | 9/2006 | Wakita | 345/204 |
| 2006/0238488 A1 | 10/2006 | Nihei et al. | |
| 2007/0091117 A1 | 4/2007 | Zhou et al. | |
| 2010/0283804 A1 | 11/2010 | Sprague et al. | |

OTHER PUBLICATIONS

European Patent Office, "International Search Report", Foreign application No. PCT/US2008/050882, 18 pages.
Claims, Foreign application No. PCT/US2008/050882, 7 pages.
Korean Patent Office, "International Search Report & Written Opinion", dated Dec. 7, 2010, application No. PCT/US2010/033906, 9 pages.
Current Claims for Korean application No. PCT/US2010/033906, 1 page.

* cited by examiner

TEMPERATURE MANAGEMENT IN AN INTEGRATED CIRCUIT CARD WITH ELECTROPHORETIC DISPLAY

CROSS REFERENCE TO RELATED APPLICATIONS

This application claims the benefit of priority under 35 U.S.C. §119(e) from U.S. Provisional Application Ser. No. 60/885,868 entitled "TEMPERATURE MANAGEMENT IN AN INTEGRATED CIRCUIT CARD WITH ELECTROPHORETIC DISPLAY", filed Jan. 19, 2007, the entire contents of which are incorporated by this reference for all purposes as if fully set forth herein.

FIELD OF THE INVENTION

The present disclosure generally relates to a display module and to an electrophoretic display module in an IC card and a temperature sensor.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An integrated circuit card (IC card) comprises a plastic card having an IC chip. The IC card may comprise a contacting type or a contact-less type. A contacting type IC card comprises metal contacts and a contact-less type comprises an RF transmission interface to allow an external card reader to transfer power and signals such that the card reader can communicate with the IC card.

IC cards include cards and memory cards. A card often comprises a microprocessor and an internal memory. The microprocessor is able to perform data storage operations and data security protection. The microprocessor often has the ability to access data that is stored in the card, and can process data and store the processed data into the internal memory of the IC card. For example, when the IC card is used in a stored-value application to store a balance or amount of money, the microprocessor can increase or reduce the balance after a transaction and store an updated balance in the card. A memory card is mainly utilized for data storage only, without having local processing power. Memory cards are commonly used in telephones, vending machines, etc.

Based on the data transmission mechanism that is used, IC cards may be classified into three types, contact type (based on International Standards Organization standard ISO 7816), contact-less type (ISO 14443 A/B/C), and dual interface type (both ISO7816 and ISO14443 A/B/C). The contact-type IC card may have 6 or 8 metal contacts. An external card reader may communicate with a contact-type IC card using 6 or 8 metallic contacts. The contact-less type IC card often comprises RF energy pick up coils, which allow the IC card to communicate with an external card reader via electromagnetic induction instead of metallic contacts.

Contact type IC cards are popular in the financial sector for applications such as credit cards or ATM bank cards, which comprise a secure IC chip package with a housing and card contacts in one plastic card. Contact-less IC cards are widely used in public transportation, e-purse and access control, etc.

In some applications there is a need to show a message within a contact-type IC card or contact-less type IC card, such as transaction value, balance or credit points etc. In a secure identification card application, some text message (e.g., name or work assignment) may be shown. U.S. Pat. Nos. 6,561,430, 6,454,172, and US published application 20060049263 describe an IC card having an embedded display device.

U.S. Pat. No. 6,454,172 uses a liquid crystal display (LCD) for the IC card display. To house the LCD display in the card form factor, IC card lamination is used, which involves high pressure and high temperature. Thus, the housing or support for the LCD display must be capable of surviving the IC card lamination process. Further, the completed IC card must be flexible. Microcup electrophoretic displays (EPD) from SiPix Imaging, Inc., Fremont, Calif. have better flexibility and durability suitable for an IC card with a display.

The Microcup EPD display is thin. The manufacturing process of the Microcup EPD display is a roll-to-roll process. Techniques for manufacturing Microcup EPD displays are disclosed in U.S. Pat. No. 6,930,818.

Frozen food is normally maintained within a predetermined temperature range during shipping. The food is at risk of spoilage when the food is not maintained in the predetermined temperature range. Therefore, shipping equipment requires a freezing mechanism to be established and also a temperature monitoring mechanism to be established. The freezing and temperature monitoring mechanisms are for checking to determine if the food is being maintained within the above-mentioned temperature range.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
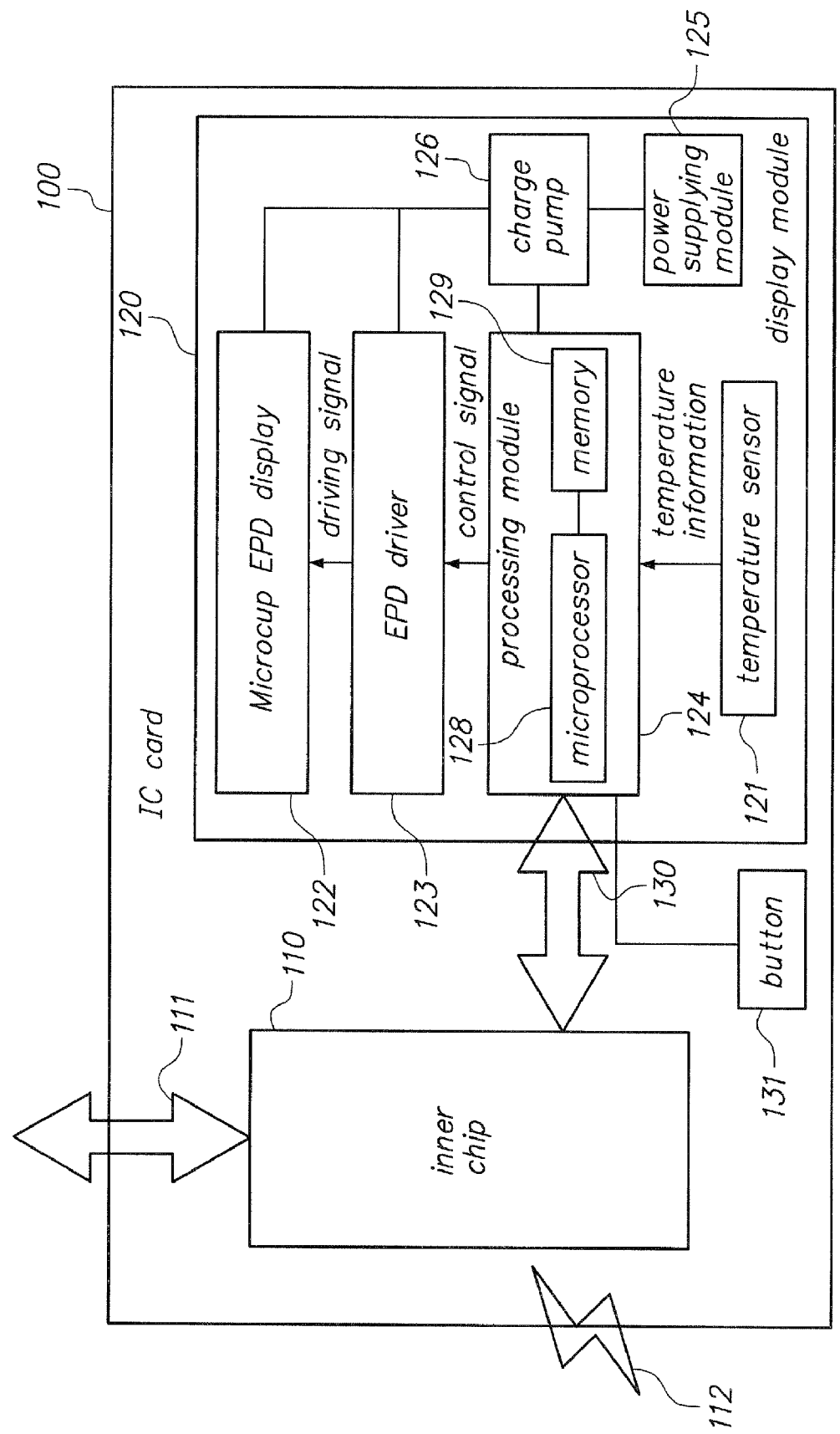
FIG. 1 illustrates an example IC card in accordance with an embodiment of the invention.

Temperature management in an integrated circuit card with electrophoretic display and a temperature sensor using an electrophoretic display module are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 General Overview

In an embodiment, an improved display module is proposed for IC card applications. In general, in an IC card, the working temperature of the card or its associated electrophoretic display is sensed, and the driving time of the EPD is increased or extended under certain temperature conditions, resulting in improving the contrast ratio of information displayed in the EPD.

In an embodiment, an electrophoretic display module in an IC card is disclosed. In one embodiment, the display module comprises a Microcup EPD.

In an embodiment, a display module in an IC card comprises a temperature sensor configured to provide temperature information; a transmission interface, coupled to an external chip of the IC card; a processing module, coupled to the temperature sensor and the transmission interface, the processing module comprising: a storage device comprising an application software program; and a processing unit, coupled to the storage device, configured to be capable of executing the application software program to access data from the external chip via the transmission interface, obtaining the temperature information from the temperature sensor, and outputting a control signal according to the temperature information and data; a display driver, coupled to the processing module, configured to be capable of receiving the control signal and generating a driving signal according to the control signal; and a display film capable of displaying images, coupled to the display driver, and configured to be capable of displaying information according to the driving signal.

In an embodiment, the display module comprises a temperature sensor, for generating temperature information; a transmission interface, coupled to a chip of the IC card; a processing module, coupled to the temperature sensor and the transmission interface, the processing module comprising: a storage device, storing an application software program; and a processing unit, coupled to the storage device, for executing the application software program to access data from the chip via the transmission interface, for obtaining the temperature information from the temperature sensor, and for outputting a control signal according to the temperature information and data; an electrophoretic display driver (EPD display driver), coupled to the processing module, for receiving the control signal and generating a driving signal according to the control signal; and an electrophoretic display (EPD display), coupled to the EPD display driver, for displaying information according to the driving signal.

According to another embodiment, an IC card is disclosed. The IC card comprises: a card IC chip; and a display module comprising: a temperature sensor, for generating temperature information; a first transmission interface, coupled to the chip; a processing module, coupled to the first transmission interface and the temperature sensor, the processing module comprising: a storage device, storing an application software program; and a processing unit, coupled to the storage device, for executing the application software program to access data from the chip via the transmission interface, for obtaining the temperature information from the temperature sensor, and for outputting a control signal according to the temperature information and data; a display driver coupled to the processing module, for receiving the control signal and generating a driving signal according to the control signal; and a display, coupled to the display driver, for displaying information according to the driving signal.

A display module of any of the preceding embodiments can be embedded in all kinds of IC cards. In an embodiment, the protocol between the display module and the inner chip is appropriately defined and the inner chip has additional I/O ports to transfer information to the display module via a transmission interface. In this way, information can be shown on the display module.

In an embodiment, the display module compensates for changes in display performance that occur according to the operating temperature. Therefore, the display performance is not influenced by the temperature and the contrast ratio of the display is significantly improved.

An embodiment provides an electrophoretic display temperature sensor, which can provide a temperature history (e.g., temperature information) to a user and has low power consumption.

According to an embodiment, an electrophoretic display (EPD) temperature sensor includes a temperature sensor, for performing a temperature sensing operation to generate temperature information; a processing module including a processing unit, for generating a display controlling signal according to the temperature information; an EPD driver for receiving the display controlling signal and generating a driving signal according to the display controlling signal; and an electrophoretic display for receiving the driving signal and performing a displaying operation according to the driving signal.

According to another embodiment, an electrophoretic display (EPD) temperature sensor includes a temperature sensor, for performing a temperature sensing operation to generate temperature information; a wireless transmission interface; and a processing module including a storage device; and a processing unit for storing the temperature information to the storage device, for reading the temperature information from the storage device, and for transferring the temperature information to an external device utilizing the wireless transmission interface.

The electrophoretic display (EPD) temperature sensor utilizes an electrophoretic display as a display screen such that the power consumption can be reduced. In addition, the EPD temperature sensor further includes a storage device and a wireless transmission interface, where the storage device is utilized to store a temperature history such that the temperature history can be provided to the user via the wireless transmission interface. The EPD temperature sensor has low power consumption and provides historical temperature information.

2.0 Description of Example Embodiments

FIG. 1 illustrates an IC card of an embodiment. An IC card 100 comprises a chip 110 (such as a card chip) and a display module 120. The display module 120 comprises a temperature sensor 121, a display 122, a display driver 123, a processing module 124, a power supplying module 125, and a charge pump 126. Electrical connections among the above-mentioned components are shown in FIG. 1.

In an embodiment, display 122 may comprise an EPD and display driver 123 may comprise an EPD display driver. EPD film may be used. In other embodiments, the display comprises a liquid crystal display film, Microcup display film, or microencapsulated display film. For example, the display module can use a microcapsule-based display film of the type described in U.S. Pat. No. 5,961,804 and U.S. Pat. No. 5,930,026. Alternatively, the display module can use microcup-based display film from SiPix Imaging, Inc., as described in U.S. Pat. No. 6,930,818.

The display module 120 is modular. For example, the display module 120 can be integrated in a single chip or embedded in many kinds of IC chips. The display module 120 can communicate with the chip 110 via the transmission interface 130 using a communication mechanism of a type known in the art. For example, the designer can define the protocol between them according to his demand. In this way, the display module 120 can communicate with the IC chip 110 to transfer data or commands under the protocol defined by the designer.

Furthermore, the display module 120 does not simply display data on the display 122. The display module 120 further comprises a temperature compensation mechanism. In an embodiment, temperature sensor 121 is utilized to detect a surrounding temperature of the IC card 100 and display module 120 and generate temperature information according to the detected temperature. The temperature information is fed to the processing module 124, which executes a temperature compensated EPD driving waveform based on the temperature data supplied from temperature sensor 121.

In the embodiment of FIG. 1, the processing module 124 comprises a microprocessor 128 and a memory 129. The memory 129 stores application software and the microprocessor 128 is a processing unit for the application software. The microprocessor 128 executes the application software program to obtain the data to be displayed from the chip 110 and convert the data to be displayed into a control signal according to the temperature information provided by the temperature sensor 121.

For example, the microprocessor 128 can adjust the control signal, which is input to the driver 123, according to the surrounding temperature, and adjust the driving clock corresponding to the original data. In this way, the driver 123 outputs a driving signal to the display 122 according to the compensated control signal. Thus, the signal waveform of the driving signal outputted by the driver 123 is adjusted. As a result, the display 122 is driven to show the data with an acceptable contrast level.

The application software program may comprise an OTP (one time password) application software program and a displaying application software program. In an example embodiment, the chip 110 obtains a key and an initial value (e.g. a time signal or a count value). In an embodiment, IC card 100 comprises a button or other input device. When a user pushes the button 131, the microprocessor 128 executes the OTP application software program to calculate a one-time password. In addition, the microprocessor 128 further executes the display application software program to convert the one-time password into a control signal using the temperature information provided by the temperature sensor 127. In this way, the driver 123 can drive the display 122 according to the control signal transferred by the microprocessor 128 such that the onetime password (OTP) is displayed on the display 122 with an acceptable contrast level in view of the current temperature.

Use of the button 131 or another input device is optional. In alternative embodiments, the IC card 100 does not comprise the button 131. For example, if the IC card is a metro card or transportation card, the display module 120 can directly obtain the related information to be displayed (such as balance or transaction amount) from the chip 110 and then display the information on the display 122 without any button operation.

The display module 120 is not a dedicated device for showing specific information. In an embodiment, display module 120 can be utilized to show data stored inside chip 110 or data transferred from an external device. For example, microprocessor 128 can execute the displaying application software program to convert the data transferred from an external device into a control signal based on the temperature information. The driver 123 then can drive the display according to the control signal such that the display 122 can show the data with appropriate contrast for the current temperature.

Figure 2:
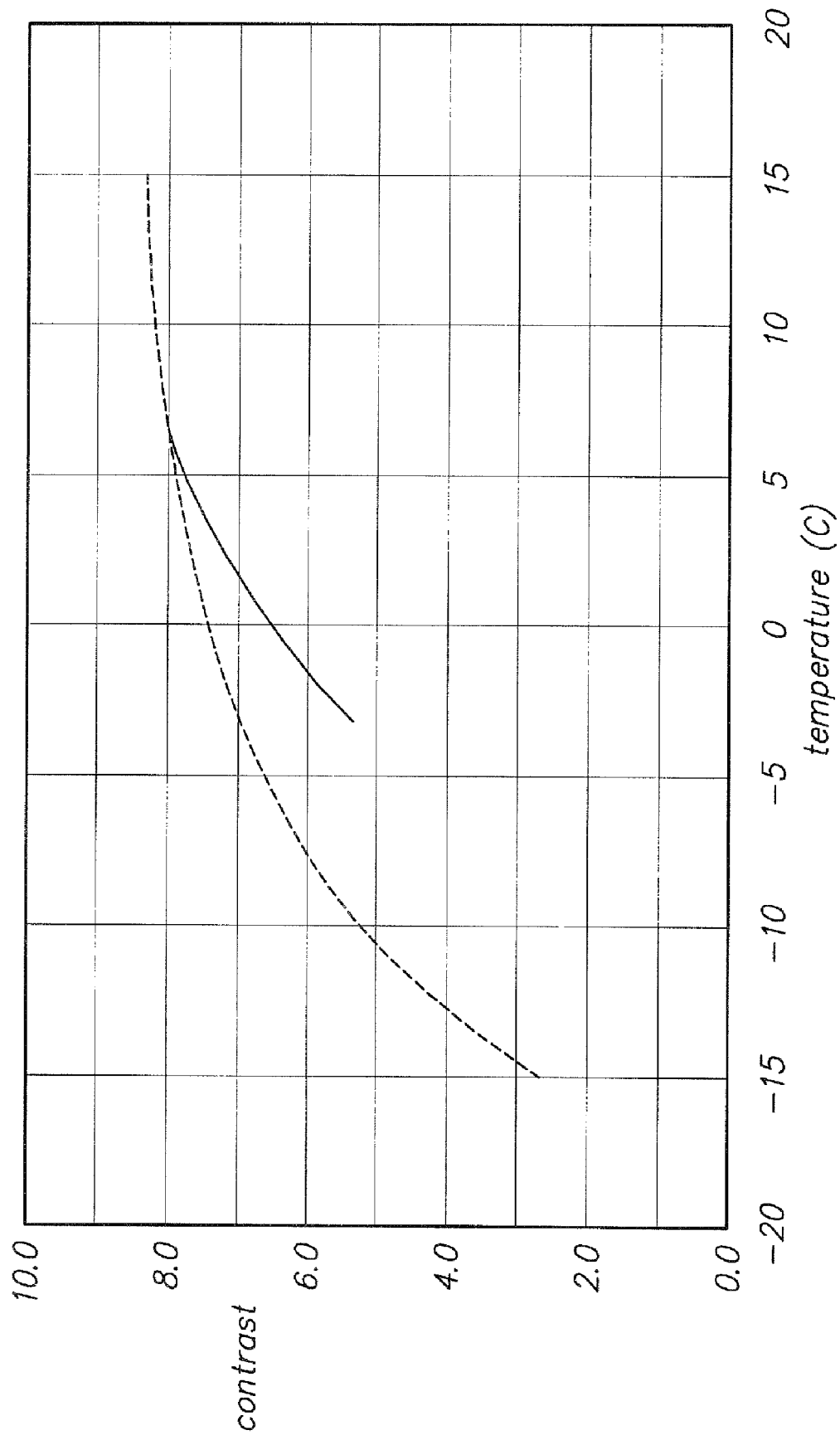
FIG. 2 illustrates a contrast characteristic of the EPD before and after temperature compensation.

FIG. 2 illustrates a contrast characteristic of an EPD before and after temperature compensation. In an embodiment, the display module 120 can perform a compensation operation according to the temperature data to provide better display performance. FIG. 2 illustrates example contrast of an EPD device before and after applying a compensation operation based on temperature data. As shown in FIG. 2, the solid curve represents a relationship between the contrast and temperature before compensation, and the dotted curve represents a relationship between the contrast and temperature after compensation.

Thus FIG. 2 shows that, compared with the contrast before compensation, the contrast after compensation for the same temperature is better. Furthermore, the working temperature range after compensation is larger. The display performance after compensation is better than that before compensation.

Figure 3:
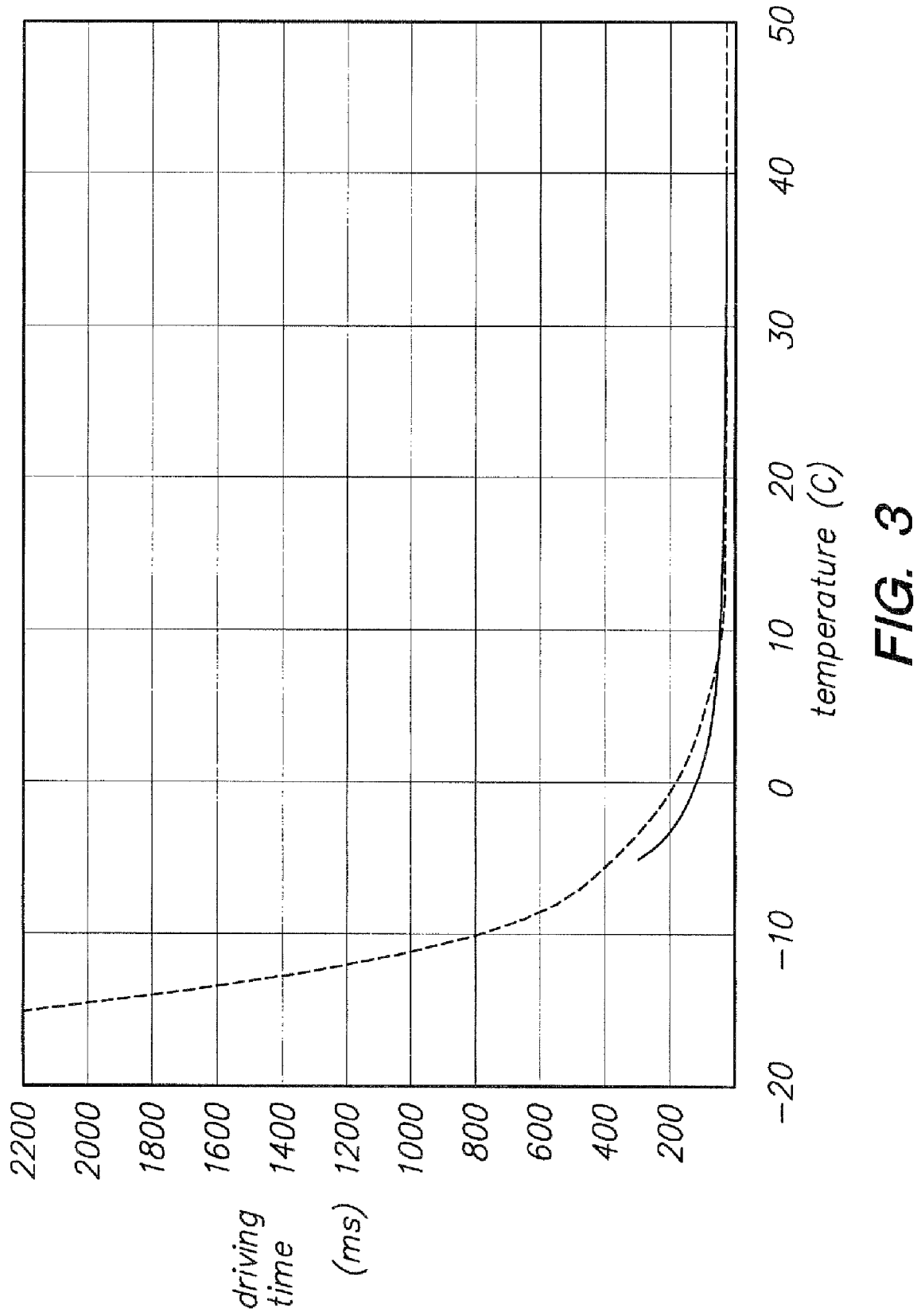
FIG. 3 illustrates a relationship between driving time and temperature when the EPD display is driven to optimized contrast.

FIG. 3 illustrates a relationship between driving time and temperature when an EPD is driven to optimized contrast. As shown in FIG. 3, the curve (representing a minimum driving time) represents the relationship between the temperature and the driving time for stripping the EPD particles, and the dotted curve represents the relationship between the driving time and the temperature in the actual implementations. As shown in FIG. 3, the driving time may vary for different temperatures. For example, the driving time is 2 seconds when the temperature corresponds to 0 C, and the driving time is 0.35 seconds when the temperature corresponds to 25 C. In other words, the display performance (such as the contrast and the driving time) with temperature compensation is significantly better than without temperature compensation.

Industry-standard IC cards are made to a specified thickness specification such as 0.76 mm maximum. In an embodiment, temperature sensor 121, processing module 124, and driver 123 can be packaged in a single chip to reduce the volume occupied by the elements. In addition, in an embodiment temperature sensor 121 can be implemented by an analog-to-digital converter or a forward-biased diode. In such an arrangement, the forward bias voltage of a diode has a negative temperature coefficient given a fixed bias current.

Moreover, in an embodiment, the power supplying module 125 provides power to the display module 120. In an embodiment, power supplying module 125 comprises a rechargeable battery or a primary battery, and outputs the power contained in the battery to the display module 120 such that the display module can work normally. The power supplying module 125 may comprise a rechargeable battery that can be recharged by an electromagnetic wave.

In this embodiment, charge pump 126 provides a high DC voltage such as 15V from a lower DC voltage of a battery such as 3V. The high voltage power supply enables an EPD to operate correctly. The charge pump circuit 126 provides regulation to overcome any battery voltage drop and to maintain a constant DC voltage output.

The chip 110 may obtain data in a variety of ways. The chip 110 can obtain data using contacts or in a wireless approach. In an embodiment, chip 110 comprises an ISO 7816 interface 111 and an ISO 14443 interface 112. Therefore, the chip 110 can obtain data from an external device (such as a card reader) via the ISO 7816 interface 111 through contacts. Alternatively, the chip 110 can obtain data from an external device via the ISO 14443 interface 112 through wireless or other non-contact transmission.

In various embodiments, display 122 may comprise a direct drive EPD display 122 or active matrix EPD display 122. The display 122 can show a variety of information including numeric information, characters, signs, or other information. The display can be a single-line display or multi-line display.

The memory 129 can be a volatile memory or a non-volatile memory. For example, the memory 129 can be an SRAM, a Flash memory, a PROM, an EPROM, or etc.

Embodiments can be embedded in all kinds of IC cards instead of specific IC cards, as long as the protocol between the display module and the chip 110 is appropriately defined and the chip 110 has additional I/O ports to transfer information to the display module via a transmission interface. In this way, the needed information can be shown on the display module. In addition, the display module can perform compensation of display performance according to the surrounding temperature. Therefore, the display performance is not influenced by the temperature and the display quality is better.

Figure 4:
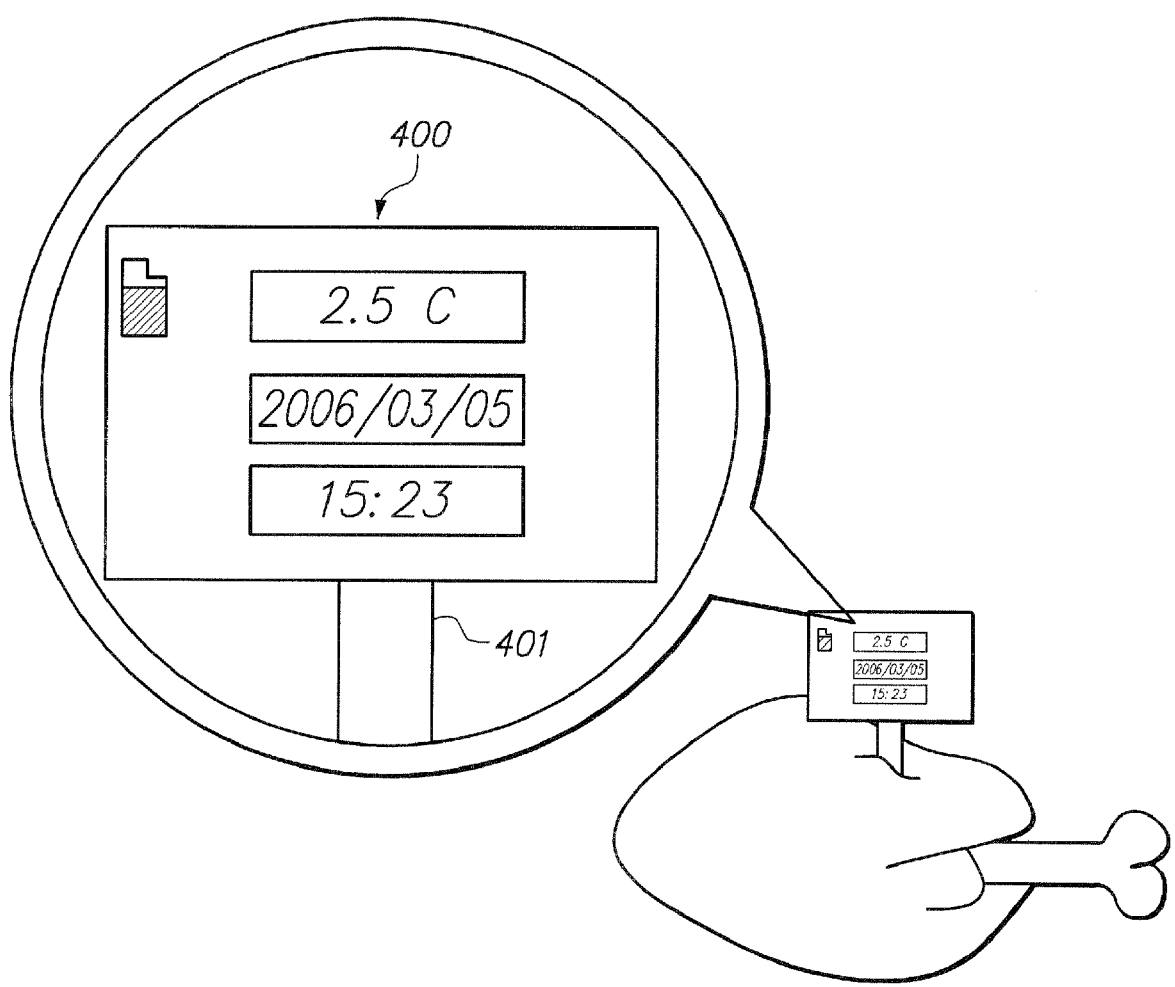
FIG. 4 is a diagram of an example EPD temperature sensor.

FIG. 4 is a diagram of an EPD temperature sensor 400. As shown in FIG. 4, the EPD temperature sensor 400 may be utilized for frozen food shipping and other applications. The EPD temperature sensor 400 comprises a probe 401. The probe 401 is inserted into the food such that the EPD temperature sensor 400 can detect the temperature of the food. Moreover, the EPD temperature sensor 400 comprises a display device. Therefore, the temperature information corresponding to the food (such as 2.5 C shown in FIG. 4) and other related information (such as the time information and the battery information shown in FIG. 4) can be shown on the display device and thereby provided to the user.

The EPD temperature sensor 400 may be covered by a non-toxic material such that the frozen food is not contaminated by the EPD temperature sensor 400.

Figure 5:
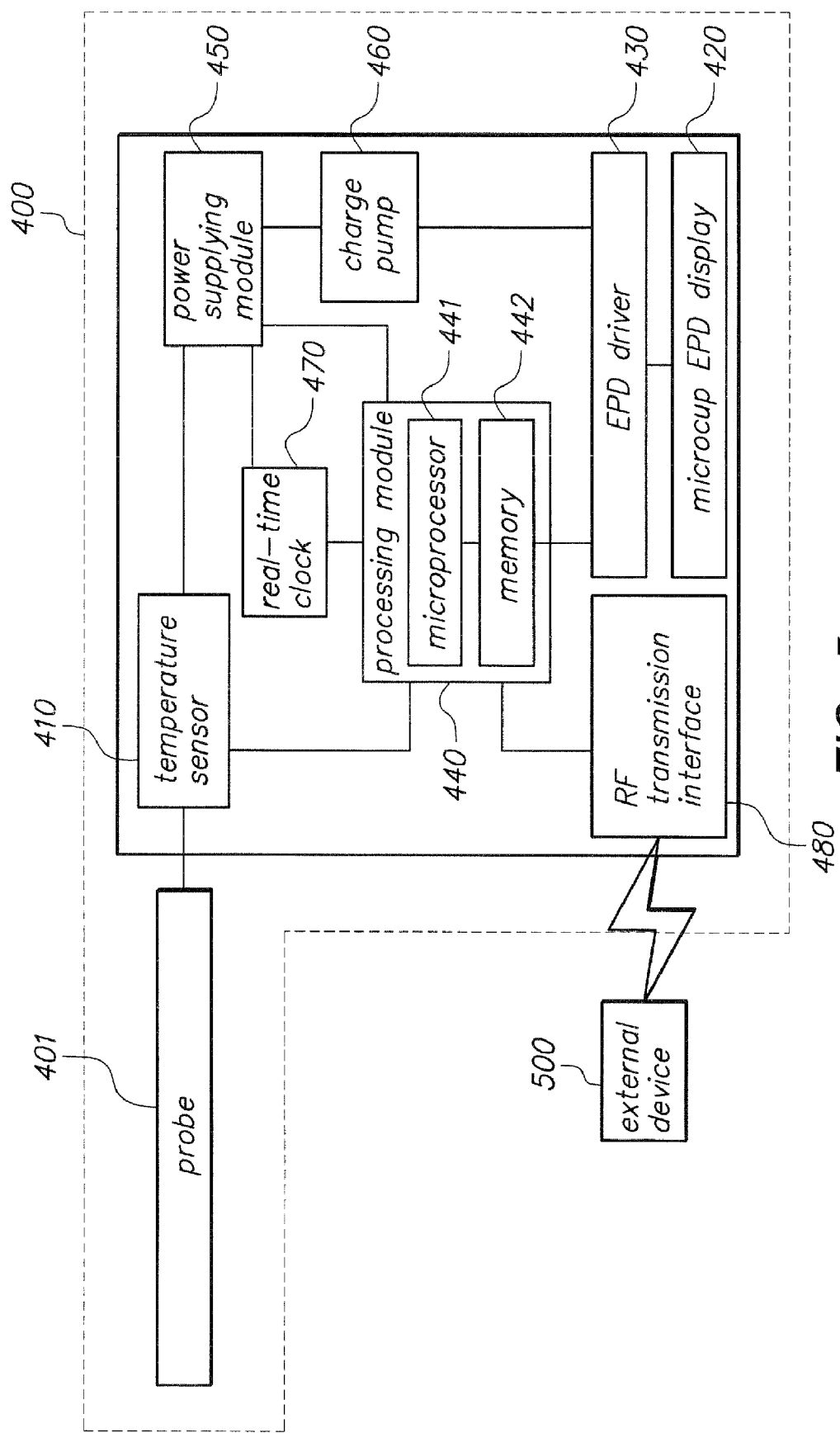
FIG. 5 is a functional block diagram of an example EPD temperature sensor.

FIG. 5 is a functional block diagram of the EPD temperature sensor 400 shown in FIG. 4. As shown in FIG. 5, the EPD temperature sensor 400 comprises a temperature sensor 410, a microcup electrophoretic display (EPD) display 420, an EPD driver 430, a processing module 440, a power supplying module 450, a charge pump 460, a real-time clock 470, and an RF transmission interface 480.

The electrical connections among the components are as follows. The processing module 440 is coupled to the temperature sensor 410, the EPD driver 430, the real-time clock 470, and the RF transmission interface 480. The EPD driver 430 is coupled to the microcup EPD display 420. The power supplying module 450 is coupled to the temperature sensor 410, the processing module 440, and the real-time clock 470 for supplying power. Moreover, the charge pump 460 is coupled to the power supplying module 450 and the EPD driver 430 for providing a correct voltage level to the EPD driver 430.

The temperature sensor 410 is coupled to probe 401. Therefore, the temperature sensor 410 detects the temperature of the food via the probe 401 for generating temperature information (such as the detected temperature of the food). The temperature sensor 410 can, for example, be implemented by an analog-to-digital converter and a forward-biased diode. In such an embodiment, for a steady current source, the relationship between the forward bias and the temperature is a negative and proportional relationship.

The real-time clock 470 is utilized for generating real-time information such as the current time. The initial time setting of the real-time clock 470 is processed by the processing module 440 via the RF transmission interface 480.

In addition, in this embodiment, the power supplying module 450 is utilized for providing power to the entire EPD temperature sensor 400. For example, the power supplying module 450 comprises a rechargeable battery or a primary battery, and outputs the power contained in the battery to the EPD temperature sensor 400 such that the EPD temperature sensor 400 can work normally. Alternatively, the rechargeable battery can be recharged by an electromagnetic wave.

In this embodiment, the charge pump 460 is used to raise the voltage level provided by the battery to a working voltage level, which is available for the EPD temperature sensor 400. The voltage level provided by the power supplying module 450 is often different from the voltage level actually used within the EPD temperature sensor 400. For example, the voltage level provided by the rechargeable battery is often between 3V and 3.6V inclusive, but the voltage level within the EPD driver 430 is often 15V. Therefore, a charge pump 460 is required to raise the voltage level from a value in the range of 3V through 3.6V to 15V such that the components of the EPD temperature sensor 400 can function normally.

In addition, as shown in FIG. 5, the processing module 440 comprises a microprocessor 441 and a memory 442. The microprocessor 441 is coupled to the memory 442. The memory 442 stores an application software program. The microprocessor 441 can be utilized as a processing unit, for executing the application software program stored in the memory 442 for performing the functions of the EPD temperature sensor 400.

As shown in FIG. 4, the EPD temperature sensor 400 can show the information in the embedded microcup EPD display 420. In this embodiment, the microprocessor 441 executes the application software program to output a display controlling signal according to the temperature information gathered by the temperature sensor 410, the real-time information provided by the real-time clock circuit 470, and the battery information gathered by the processing module 440. For example, the information can be gathered by an analog-digital converter embedded in the processing module 440. Next, the EPD driver 430 receives the display controlling signal and outputs a driving signal to the microcup EPD display 420 according to the display controlling signal such that the EPD display 420 can be correctly driven. Therefore, the EPD display 420 can display the current temperature information of the food, for example, 2.5 C as shown in FIG. 4, the real-time information 15:23 and 2006/3/5 shown in FIG. 4, and battery status information such as the battery symbol shown in FIG. 4.

Moreover, the EPD temperature sensor 400 further supports a function of recording a temperature history. In this embodiment, the microprocessor 441 executes the application software program stored in the memory 442 to record the relationship between the temperature and the time for storage to the memory 442. For example, the microprocessor 441 can record the relationship between the temperature and the time as a curve.

In this embodiment, the RF transmission interface 480 is utilized as a communication medium between the EPD temperature sensor 400 and an external device 500. For example, the user can use the external device 500, which can be, but is not limited by example, a desktop computer, a laptop, or a personal digital assistant (PDA), to communicate with the EPD temperature sensor 400 via the RF transmission interface 480 such that the relationship between the time and the temperature can be read from the memory 442. The RF transmission interface 480 can be a 13.56 MHz RFID transmission interface or a wireless tag transmission interface using VHF/UHF frequency band such as a EPC/G2 standard. Alternatively, the RF transmission interface 480 may use other RF transmission methods.

Via the RF transmission interface 480, the user can perform operations such as setting time and temperature range of the EPD temperature sensor 400 utilizing the external device 500 and the RF transmission interface 480. For example, a corresponding protocol between the external device 500 and the EPD temperature sensor 400 may be used.

As an alternative to the RF transmission interface 480, an embodiment can utilize other wireless transmission interfaces such as a Bluetooth transmission interface or an infrared transmission interface.

Figure 6:
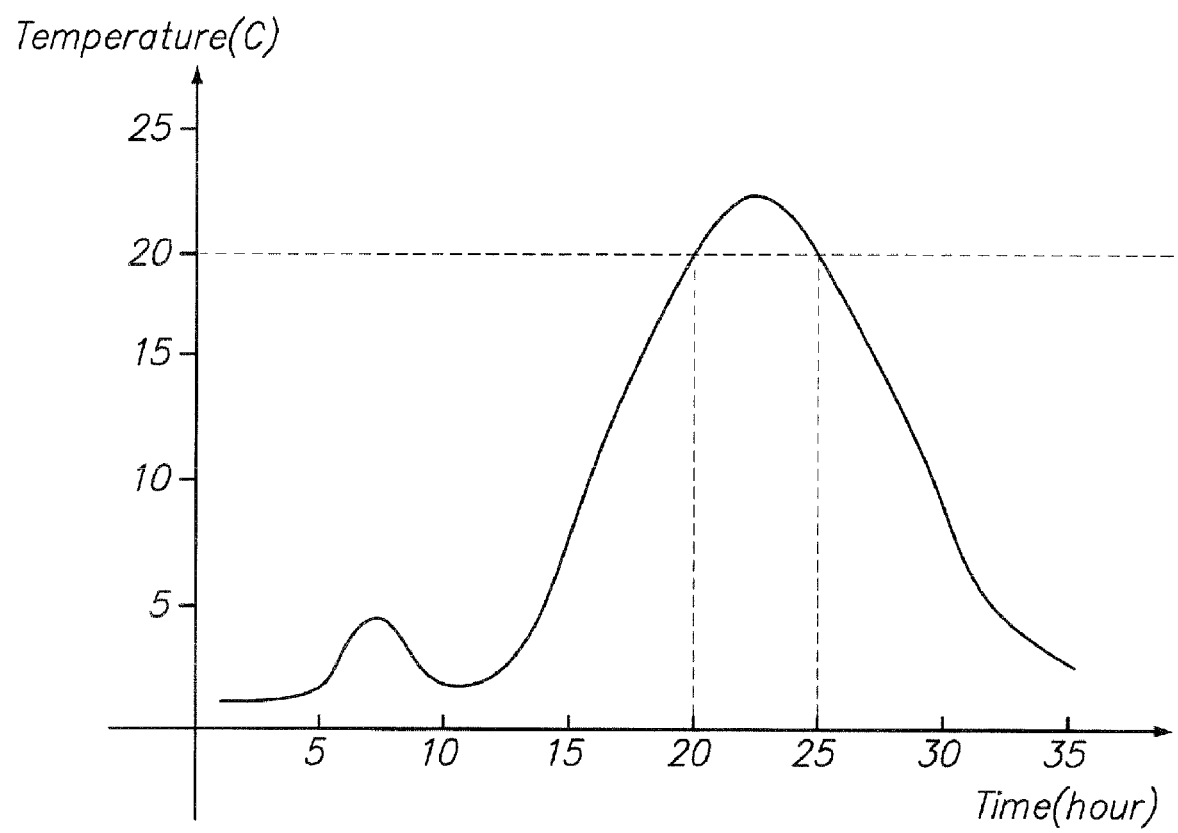
FIG. 6 is a diagram showing a curve corresponding to the relationship between time and temperature related to shipping of frozen food.

FIG. 6 is a diagram showing a curve corresponding to the relationship between the time and the temperature. In an embodiment, sensor 400 stores the corresponding relationship between the temperature and the time in the memory 442. Therefore, the user can utilize the above-mentioned external device 500 to read the corresponding relationship and then the corresponding relationship is displayed by the external device 500.

As shown in the example of FIG. 6, the horizontal axis represents the time, and the vertical axis represents the temperature of the food. Therefore, the user can easily determine whether the temperature has exceeded a predetermined temperature. The horizontal dashed line at 20 C shown in FIG. 6 represents the predetermined temperature. The vertical dashed lines at 20 hours and 25 hours represent the time interval when the measured temperature of the food exceeded the predetermined temperature. In FIG. 6, the corresponding time interval is 5 hours. Therefore, in this example, the user can determine the possibility that the food is rotten according to the curve. In this way, the security of shipping the food is increased.

In an embodiment, the present invention utilizes the microcup EPD display 420 is the display device of the EPD temperature sensor 400. Since the power consumption of the microcup EPD display 420 is quite low, the power consumption of the entire EPD temperature sensor 400 is reduced accordingly. However, different types of EPD displays can be used to meet various requirements such as saving power. For example, a direct drive microcup EPD display, an active matrix microcup EPD display, or an E-ink EPD display may be used.

Memory 442 can be a volatile memory or a non-volatile memory. For example, the memory 442 can be an SRAM, a Flash memory, a PROM, an EPROM, or any other type of memory or storage.

Additionally, the temperature sensor 421, the processing module 424, and the EPD driver 423 can be packaged in a single chip.

3.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A display module in an IC card, the display module comprising:
   a temperature sensor configured to provide temperature information;
   a transmission interface, coupled to an external chip of the IC card;
   a processing module, coupled to the temperature sensor and the transmission interface, the processing module comprising:
   a storage device comprising an application software program; and
   a processing unit, coupled to the storage device, configured to execute the application software program to access data from the external chip via the transmission interface, to obtain the temperature information from the temperature sensor, and to output a control signal according to the temperature information and data;
   a display driver, coupled to the processing module, configured to receive the control signal and to generate a display driving signal according to the control signal; and
   a display film configured to display images, coupled to the display driver, and configured to display information according to the display driving signal
   wherein the display module is configured to perform, based on the temperature information, a temperature compensation operation on the display driving signal that increases contrast of the images on the display film;
   wherein the application software program comprises an OTP (one time password) software program and a displaying application software program, and wherein the processing unit is configured to execute the OTP software program and the displaying application software program to obtain an OTP key and to convert the OTP key or external information into the control signal according to the temperature information generated by the temperature sensor.

2. The display module of claim 1, further comprising a power supply module configured to supply power to the display module.

3. The display module of claim 2, wherein the power supply module comprises a rechargeable battery.

4. The display module of claim 2, further comprising a charge pump configured to convert a low voltage level provided by the power supply module into a specific voltage level to be utilized in the display module.

5. The display module of claim 1, wherein the storage device is a volatile memory.

6. The display module of claim 1, wherein the storage device is a non-volatile memory.

7. The display module of claim 1, wherein the IC card is a card, and the chip is a card chip.

8. The display module of claim 1 wherein said display film is an electrophoretic display film.

9. The display module of claim 1 wherein said display film is a liquid crystal display film.

10. The display module of claim 1 wherein said display film comprises a MICROCUP display film.

11. The display module of claim 1 wherein said display film comprises microencapsulated display film.

12. An IC card comprising:
   an external chip; and
   a display module comprising:
      a temperature sensor, configured to provide temperature information;
      a first transmission interface, coupled to the external chip;
      a processing module, coupled to the first transmission interface and the temperature sensor, the processing module comprising:
         a storage device, configured to store an application software program; and
         a processing unit, coupled to the storage device, configured to execute the application software program to access data from the external chip via the transmission interface, to obtain the temperature information from the temperature sensor, and to output a control signal according to the temperature information and data;

a display driver, coupled to the processing module, configured to receive the control signal and to generate a display driving signal according to the control signal; and a display film configured to display images, coupled to the display driver, and configured to display information according to the display driving signal wherein the display module is configured to perform, based on the temperature information, a temperature compensation operation on the display driving signal that increases contrast of the images on the display film;

wherein the application software program comprises an OTP (one-time password) software program and a displaying application software program, and the processing unit is configured to execute the OTP software program and the displaying application software program, obtaining an OTP key and converting the OTP key or external information into the control signal according to the temperature information generated by the temperature sensor.

13. The IC card of claim 12, further comprising a power supply module, for supplying power to the display module.

14. The IC card of claim 13, wherein the power supply module comprises a rechargeable battery.

15. The IC card of claim 13, wherein the display module further comprises a charge pump, configured to convert a voltage level provided by the power supply module into a specific voltage level to be utilized in the display module.

16. The IC card of claim 12, wherein the storage device is a volatile memory.

17. The IC card of claim 12, wherein the storage device is a non-volatile memory.

18. The IC card of claim 12, wherein the external chip further comprises a second transmission interface, for reading the data from an external device.

19. The IC card of claim 18, wherein the second transmission interface is an ISO 7816 interface.

20. The IC card of claim 18, wherein the second transmission interface is an ISO 14443 interface.

21. The IC card of claim 12, wherein the IC card is a card.

22. The IC card of claim 12, wherein the chip is a card chip.

23. The IC card of claim 12 wherein said display film is an electrophoretic display film.

24. The IC card of claim 12 wherein said display film is a liquid crystal display film.

25. The IC card of claim 12 wherein said display film is a MICROCUP display film.

26. The IC card of claim 12 wherein said display film is microencapsulated display film.

* * * * *